US008975604B2

(12) United States Patent
Iverson et al.

(10) Patent No.: US 8,975,604 B2
(45) Date of Patent: Mar. 10, 2015

(54) EMISSIVITY ENHANCED MID IR SOURCE

(75) Inventors: John R. Iverson, Stoughton, WI (US); John Magie Coffin, Blue Mounds, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 100 days.

(21) Appl. No.: 12/562,688

(22) Filed: Sep. 18, 2009

(65) Prior Publication Data

US 2011/0068271 A1    Mar. 24, 2011

(51) Int. Cl.
*A61N 5/06* (2006.01)
*G01J 3/10* (2006.01)

(52) U.S. Cl.
CPC ...................................... *G01J 3/108* (2013.01)
USPC ...................................................... 250/504 R

(58) Field of Classification Search
USPC ................. 250/504 R, 495.1, 503.1; 219/553
See application file for complete search history.

(56) References Cited

U.S. PATENT DOCUMENTS

| | | | | |
|---|---|---|---|---|
| 3,771,731 A | * | 11/1973 | Dyner et al. | ............... 250/504 R |
| 3,949,231 A | | 4/1976 | Blunck et al. | |
| 4,499,382 A | | 2/1985 | Vincent | |
| 4,724,329 A | | 2/1988 | Doyle et al. | |
| 4,754,141 A | * | 6/1988 | Mindock | ........................ 250/343 |
| 4,780,613 A | | 10/1988 | Berstein et al. | |
| 4,935,633 A | | 6/1990 | Curbelo et al. | |
| 5,291,022 A | * | 3/1994 | Drake et al. | ............... 250/504 R |
| 5,519,219 A | | 5/1996 | Alexay et al. | |
| 5,644,676 A | * | 7/1997 | Blomberg et al. | ............. 392/407 |
| 5,984,998 A | | 11/1999 | Ottesen et al. | |
| 6,344,647 B1 | * | 2/2002 | Jourdain et al. | ......... 250/339.07 |
| 6,921,910 B2 | | 7/2005 | Curbelo | |
| 7,049,597 B2 | | 5/2006 | Bodkin | |
| 7,119,337 B1 | * | 10/2006 | Johnson et al. | .......... 250/339.13 |
| 7,119,904 B2 | | 10/2006 | Coffin et al. | |
| 7,760,341 B2 | * | 7/2010 | Bakshi et al. | .................... 356/51 |
| 2005/0019492 A1 | * | 1/2005 | Chandhok et al. | ......... 427/249.8 |
| 2007/0018103 A1 | * | 1/2007 | DeCamp et al. | ......... 250/339.06 |

FOREIGN PATENT DOCUMENTS

| | | |
|---|---|---|
| JP | 10090060 | 4/1998 |
| JP | 2003149133 | 5/2003 |

OTHER PUBLICATIONS

Vassallo et al., "Infrared Emission Spectroscopy of Coal Minerals and their Thermal Transformations," Society for Applied Spectroscopy, vol. 46 (1), pp. 73-78, 1992.

* cited by examiner

*Primary Examiner* — Nicole Ippolito
*Assistant Examiner* — Jason McCormack
(74) *Attorney, Agent, or Firm* — Ion C. Abraham

(57) ABSTRACT

An infrared (IR) source apparatus that includes a desired infrared source element coupled to an insulating housing so to minimize overall source inefficiency at desired optical bandwidths is introduced. The insulation itself is machined or configured in a way so that the infrared source element is in contact with a designed cavity in the insulation so that the IR source image becomes the average of the insulation material and the infrared element. Such an arrangement of the present invention increases the emissivity of the IR source below about 1500 wave numbers, more often, below about 1100 wave numbers, and even more particularly, at about 1079 wave numbers. Accordingly, the combined emissivity of the infrared source and the insulation substantially enhances spectral emission and eliminates or reduces spectral artifacts from the formation of oxides on the infrared source surfaces.

19 Claims, 4 Drawing Sheets

EMISSIVITY ENHANCED MID IR SOURCE

FIELD OF THE INVENTION

The present invention relates to the field of light sources and more particularly, to infrared sources utilized in analytical instruments, such as infrared spectrometers.

BACKGROUND OF THE INVENTION

Conventional infrared emission sources typically utilize a wire, metal or ceramic element that is heated to emit a continuous band of optical radiation. In particular, the source elements, e.g., an infrared igniter source element, that is incorporated into infrared spectrometers, such as, FTIR instruments, are often modifications or adaptations of commercial heating elements. Examples include filaments configured from resistive electrical conductive materials, such as Kanthal, (i.e., alloys known for their ability to withstand high temperatures and having intermediate electric resistance) and those manufactured from silicon carbide. Another example includes the use of a silicon nitride-tipped glo-plug used for preheating the combustion chamber in a diesel engine.

Stabilization of the source, such as when using silicon carbide, however, can be a major issue, especially when the heating element is exposed to ambient conditions. For example, air turbulence in proximity to the source can cause localized cooling in addition to source noise induced from index of refraction of changes resulting from hot air close to the source and nearby cooler air. Typically, these issues can be reduced by surrounding the source element with a thermally insulating enclosure but with an opening in the enclosure to enable a beam of desired infrared radiation to exit in a designed manner. The insulation, in such an arrangement, helps stabilize the output in addition to enabling operating voltages to be decreased.

Another egregious instability, however, when using carbide elements as the igniter source, is that as the element is heated to temperatures approaching 1300° C., material changes, such as oxidation and thermal degradation, can produce inhomogeneities in the desired spectral output so as to affect the measurement results and thus necessitating, for example, artificial spectral corrections of the source.

Another source of spectral instability occurs in the imaging of the source itself due to its geometry. In operation, an igniter source element when made from highly resistive silicon carbide is often configured as a loop, i.e., a U-shaped heating element, which is electrically coupled to a power source so as to heat the element to a high temperature that enables the element to radiate over a broad range of predetermined infrared electromagnetic bandwidths. The issue arises in imaging the central portion of the U-shape because there is a resultant loss of emissivity in the central portion as opposed to the outer portions of the optically relayed image directed throughout the spectrometer, which can cause problems when interpreting the spectral information.

Background information on an apparatus that provides for such an infrared source, the disclosure of which is incorporated herein by reference in its entirety can be found in U.S. Pat. No. 5,291,022, to Drake et al., issued Mar. 1, 1994, entitled; "High Efficiency Infrared Source," including the following: "An infrared source for use in an infrared spectrometer includes an insulator core having a containment cavity, an outlet port in communication with the containment cavity, and an electrically heated infrared element mounted in the containment cavity with a portion thereof facing the outlet port and with the walls of the containment cavity closely spaced to the infrared element. The insulator core is formed of a ceramic fiber material which has excellent resistance to heat and very low thermal conductivity so that very little heat from the infrared element escapes from the insulator core except as infrared radiation through the outlet port. The insulator core is preferably mounted within a central cavity of a metal housing, and may be sealed off from the ambient atmosphere by an infrared transmissive window sealed to an outlet opening in the housing. The electrical supply lines from the infrared element may extend through an opening in the housing which is closed and sealed to inhibit the passage of gases from the ambient atmosphere into the interior of the housing. Where the infrared element is sealed off from the ambient atmosphere in this manner, potentially corrosive gases will be inhibited from reaching the hot infrared element. This containment of the infrared element within the insulator core allows the element to be maintained at a desired temperature for radiating infrared for use in analytical instruments such as infrared spectrometers, while consuming very low amounts of electrical power."

In general, conventional systems that utilize sources described, as discussed above, have had problems associated with imaging of the source as well as material changes in the infrared elements that cause changes in the emitted spectral output. Accordingly, a need exists for an improved infrared emissivity source that can address the desires of the technical community and thus, the present invention is directed to such a need.

SUMMARY OF THE INVENTION

The present invention thus provides for an infrared source and method that increases (e.g., by up to about 50%) the emissivity in desired optical ranges of the configured source below about 1500 wavenumbers. In particular, the present invention is directed to an infrared source, more often a mid-infrared source that includes a silicon based infrared source element (e.g., silicon nitride, silicon carbide, etc.) in combination with an insulating material, such as, but not limited to aluminum oxide or zirconium oxide, that are configured so that the combination of elements provides for a co-added source spectrum of infrared output illumination. Even more specifically, the insulation itself is machined or modified in a way so that the infrared source element is in contact (e.g., intimate contact) or in close proximity to (i.e., adjacent) with a resultant configured cavity in the insulation so that the IR source image becomes the average of the insulation material and the infrared source element due to the co-added spectra. Such an arrangement of the present invention increases the emissivity of the IR source below about 1500 wave numbers, more often, below about 1100 wave numbers, and even more particularly, at about 1079 wave numbers.

Accordingly, the present invention provides for an infrared source that includes: an infrared element which provides infrared radiation at desired wavelengths when heated within a predetermined temperature range; an insulator coupled with the infrared element so as to reach a collaborative temperature range provided by the generated heat from the infrared element, wherein the insulator at the collaborative temperature range provides for one or more desired infrared emission spectral bands that co-add with the output emission of the infrared element so as to eliminate spectral deficiencies resulting from the infrared element reaching the collaborative temperature range; and wherein one or more walls of the insulator are configured as a conical interior that converges to an opening that defines an optical aperture of the source so as to enhance emission of the co-added insulator and infrared element and additionally match a field of view of a coupled spectrometer imaging element.

DETAILED DESCRIPTION OF EMBODIMENTS

Figures 1A, 1B:
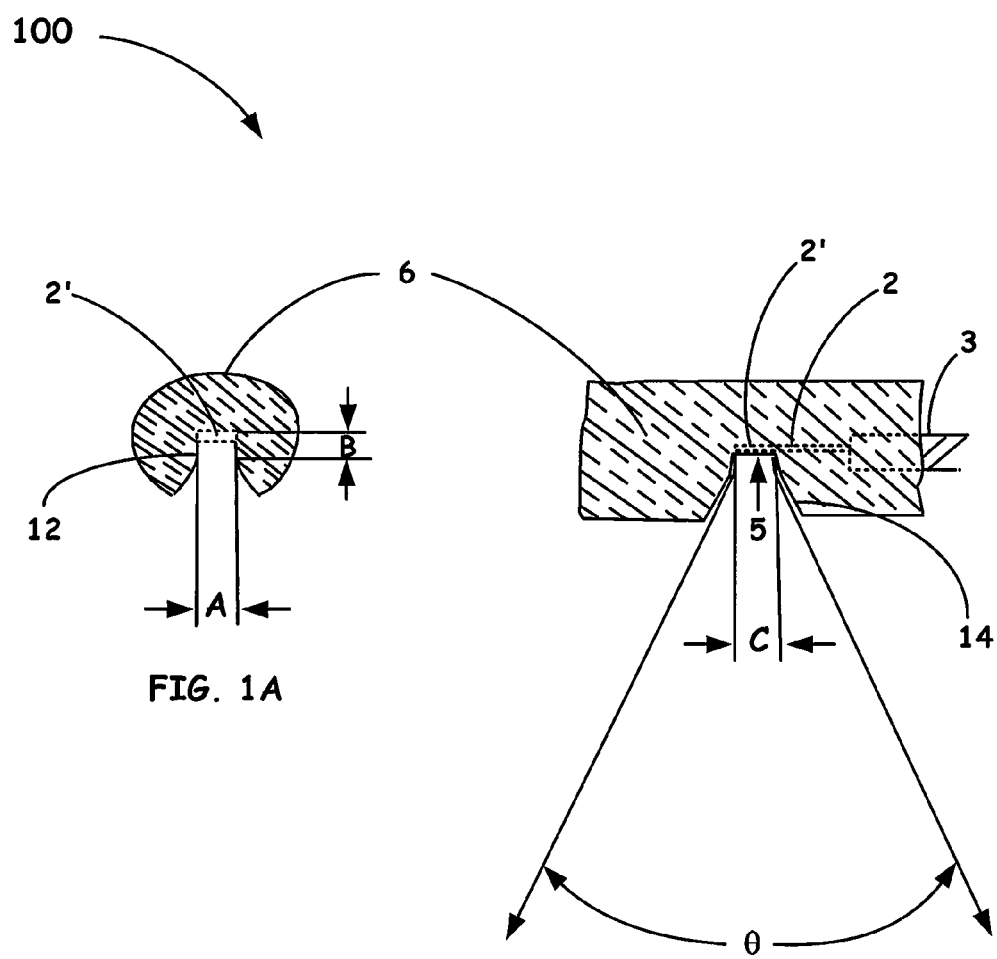
FIGS. 1A and 1B depict alternative side views of an example beneficial IR source embodiment of the present invention.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Additionally, it is understood that any list of such candidates or alternatives is merely illustrative, not limiting, unless implicitly or explicitly understood or stated otherwise.

Moreover, unless otherwise indicated, numbers expressing quantities of ingredients, constituents, reaction conditions and so forth used in the specification and claims are to be understood as being modified by the term "about." Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

The present invention is directed to an IR, e.g., a Mid Infrared optical source apparatus aimed at substantially eliminating output artifacts in a single beam spectrum resulting from silicon based infrared elements, in particular silicon nitride infrared elements.

The improved source of the present invention does not include a window as windows block some of the emitted radiation and add cost. However, because the infrared sources of the present invention are exposed to air and because such desired sources are silicon based, they form oxides, often complex metal oxides on the surface as they are run at temperatures that are high enough (at temperatures approaching about 1300° C. and above) to allow them to be used as, for example, Mid IR sources. As the oxides form they cause a drop in emissivity at specific wavelengths, which are typically below 1500 wave numbers, often below about 1100 wave numbers.

The present invention addresses this problem in a novel fashion by a combination of a configured insulation cavity coupled to the infrared (e.g., igniter) element in a contact or adjacent arrangement so as to enable the emissivity below about 1500 wave numbers to be co-added so that the averaged output provides for a more uniform spectrum.

In particular, the infrared source element is coupled to the insulation in a manner (i.e., in contact with or adjacent to the insulator) that allows the insulation to also be heated so that it emits energy at the desired wave lengths that have dropped off in emissivity due to the oxides on the heated surface of the infrared source. Generally, this novel configuration works preferably with the infrared source being configured from silicon nitride and the insulation being configured from, for example aluminum oxide or zirconium oxide. Zirconium oxide, in particular, is beneficial in that it is a more efficient insulator and is a soft and porous material that tends to have better emissivity. In addition, the configured optical cavity and chosen insulation material also operates as an integrating sphere for the energy that is emitted.

Specific Description

As discussed above, the present invention provides for a novel IR source apparatus that includes an infrared element, e.g., an infrared igniter element, nested in a contacted manner, e.g., in substantial contact with a desired insulating material, such as, but not limited to, zirconium oxide or in close proximity (i.e., adjacent) to the insulating material so as to in either configuration, enable effective heating of the insulator at about the temperature range of the infrared source element. As stated above, a similarly designed apparatus can be found in U.S. Pat. No. 5,291,022, to Drake et al., issued Mar. 1, 1994, entitled; "High Efficiency Infrared Source," the disclosure of which is incorporated herein by reference in its entirety.

Desired materials that can be incorporated as the infrared element of the present invention include, but are not limited to, carbides, particularly silicon carbide (doped and undoped), but more often, the infrared element is preferably silicon nitride. With respect to silicon carbide as the infrared element, such an element, while still beneficial when configured in the present invention, is generally known to produce undesired optical artifacts in the single beam spectrum that can change in time approaching a 50% loss of emissivity at about the 1079 wave number region. Moreover, hot spot migration and oxidizing of a silicon carbide source element often result in a low or a changing throughput.

Silicon nitride, however, is a more desirable infrared source element, despite it being more expensive than silicon carbide devices and having a similar loss of emissivity at less that about 1500 wave numbers, e.g., at about 1079 wave numbers when operated at similar temperature ranges, and despite tending to require more power to run the devices (e.g., between about 18-25 watts than about similar configured 10-16 watt silicon carbide devices).

The upside to silicon nitride, however, is embedded in the fact is that it is designed as a diesel engine glow plug comprised of undoped materials that are in essence a plug of material coupled in a sleeve-like manner to a Tungsten element. Because of such a configuration, these types of infrared elements make for a more durable and repeatable element for use in the present invention because the element minimizes hotspot migration and fractures from assembly and handling and/or adverse changes to resistivity at less than about 0.1% over the life of the part due to oxidation. Example operating parameters when using such silicon nitride elements in the present invention include running the device from about 700 degrees C. up to about a max temp of 1400 degrees C., more often at about 1200 degrees C., from about 9 volts up to about 13 volts DC.

Geometrically, the infrared elements of the present invention can include various cross sections that include, but are not limited to, a polygon, a rectangle, a sphere, an ellipse, and each capable of being coupled to conductive leads to heat the devices and thus provide for the desired infrared emission. Generally, the purpose of the cross-sectional configurations disclosed herein is to eliminate the problems associated with past imaging problems, such as, imaging the U-shaped silicon carbide elements that have been conventionally utilized in the past. In particular, because of the U-shaped design, a void (i.e., a decrease of intensity in the central portion of the image) resulting in the emissivity pattern is ultimately imaged downstream into the spectrometer instrument. In the present invention, the use of, for example, a plug of material, such as, for example, a plug of silicon nitride material as the infrared source and having, for example, dimensions of up to about 2 inches in length and up to about ⅛ inches in diameter eliminates the void in the imaged beam because the object itself does not have a removed central portion.

Turning now to the insulating materials, such suitable electrically insulating materials include, but are not limited to, one or more metal oxides such as aluminum oxide, a nitride such as, aluminum nitride, silicon nitride, boron nitride, and zirconium, wherein zirconium is generally preferred. Even more particular with respect to zirconium, the material often comprises a soft porous ceramic fiber resulting from Zircar Zirconia, Inc., such as, ZYZ3, and ZYZ6, which is stronger than ZYZ3. Type ZYZ insulators are thus porous yet rigid, refractory structures composed of yttria-stabilized zirconia fibers that are bonded with silica. Such a composition provides for insulation material having a low thermal conductivity of zirconia fibers combined with the strength and machinability of a silica bonded material. Moreover, the particular material is evenly bonded, which enables it to be CNC machined to tight tolerances and intricate shapes.

Accordingly, the above described material, in addition to other beneficial properties, provides for desired insulating properties and is designed to withstand high temperatures of up to about 1650 DEG C. without decline in mechanical and heat insulation characteristics. Moreover, because it is a poor conductor of heat, it enables trapped air within the machined cavity of the present invention to reach collaborative temperatures of about the infrared element itself in a rapid manner so as to minimize heat loss through the air. The surprising result of such a property benefits the present invention because as the insulating material rapidly heats up to the temperature ranges induced by the infrared element (i.e., collaborative temperatures of about 700 degrees C. up to about 1400 degrees C.), it operates as a blackbody emitter that provides for emissivity bands below about 1500 wave numbers to be emitted in conjunction with the emission bands provided by the infrared material at the chosen operating temperatures. The important aspect is that the insulating material in its heated operational condition provides for an emission spectrum that, as disclosed herein, co-adds with the output emission of the infrared source (Note that aluminum oxide insulators (e.g., Rath 174/700) can also provide for such a benefit but not as efficiently as zirconium oxide). In effect, the combined spectral output is the result of co-added spectra that substantially eliminates the spectral deficiencies provided by the output of the infrared source as deleterious oxides are formed at the desired operating temperatures. In addition, because of its porous structure, the material in receiving optical radiation from the source also operates as almost a perfect emitter so as direct radiation back to the infrared source in an integrating sphere fashion so as to improve overall emissivity provided by the source.

As disclosed above, the infrared elements of the present invention generally reach the required temperature ranges by way of an electrical excitations means as directed through the coupled conductive leads of the devices. As an alternative embodiment, the infrared sources described herein can also be heated by an optical excitation means, in particular, laser optical excitation, to additionally induce the desired temperatures in the elements and thus also result in blackbody emission. The laser excitation sources can include, but are not limited to, continuous wave (CW) and/or solid state devices, more often laser diode devices of a suitable wavelength (e.g., less than about 1 micron) that can be readily absorbed by a configured infrared element. A beneficial result of using laser excitation includes the use of higher temperature ceramics that can be shaped to optimize the generating light.

Turning now to the drawings, FIGS. 1A and 1B depict alternative side views of an example beneficial IR source embodiment of the present invention, generally designated by the reference numeral 100. In particular, FIGS. 1A and 1B both illustrate an infrared (e.g., igniter) source 2 being in substantial contact with or adjacent to a chosen insulator material 6 in a novel fashion, as previously discussed above.

The insulator 6 core itself is more often formed of a zirconium fiber ceramic material as described above, which is relatively soft and therefore can be penetrated by a hard material such as a solid infrared element 2. A means for forming the cavity, which includes the walls denoted by the reference characters 12 and 14, and the infrared element 2 combination, includes pressing the infrared element 2 into a solid block forming the insulator 6 core until the infrared element extends to a desired termination point within the insulator core at an apex of the conically-shaped interior formed by the walls 12 in the core (e.g., a conically-shaped hole having an outside diameter of up to about 0.210 inches as denoted by the letter A, as shown in FIG. 1A, and an inside diameter of up to about 0.180 inches as shown in FIG. 1B by the reference letter C, and with a length of up to about 0.020 inches, as shown in FIG. 1A by the letter B, each shown with accompanying arrows).

Also shown is a high temperature resistant ceramic cement material 3 that (e.g., Sauereisen Electrotemp #8 cement) in collaboration with other known elements, e.g., o-rings, caps, etc., as discussed in incorporated by reference U.S. Pat. No. 5,291,022, helps seal the infrared element 2 within the insulator 6.

In such a configuration, the infrared element 2 and the walls 12 of the conically-shaped hole are formed in the insulator 6 so as to be substantially in contact except at the aperture defining opening 5, as shown in FIG. 1B, which makes up the bottom of the cone-shaped hole and of which is slightly larger than the exposed bottom end 2' of infrared element 2.

In addition, by constructing the walls 12 in a manner shown in FIGS. 1A and 1B (i.e., by configuring the walls 12 to provide a conical interior that converges to an to an opening that defines an optical aperture of the infrared source) so as to also operate as the outlet port of the insulator 6 core, minimizes the air space around the heating infrared element 2 to thus also prevent deleterious refractive heating effects. As an alternate beneficial embodiment, the cavity can also be constructed by CNC machining the insulator to tight tolerances designed to receive the infrared element 2. Preferably in either means of conforming the cavity, the infrared heating element 2 is configured so that only the bottom end 2', as shown in FIG. 1B, of the infrared element, which is adjacent to the defined opening 5, attains the maximum heating temperature.

It is to also be appreciated that the beveled opening via configured walls 14, as denoted in FIG. 1B, in conjunction with the conical interior defined by the walls 12, helps minimize optical vignetting by collectively operating as an optical cavity having a desired field of view that includes a numerical angle of acceptance $\theta$, as shown in FIG. 1B. Such a field of view construction is accordingly designed so as to be optimized with a coupled optical refractive or reflective imaging element within a spectrometer system of the present invention, such as, for example an off-axis parabolic reflector having the predetermined optical design parameters, e.g., f# considerations from about an f/4 to about an f/1. Such an arrangement thus provides for spot size characteristics that enable both the insulator material 6 and the infrared element 2 to be uniformly optically relayed throughout one or more designed imaging planes in a spectrometer system with an increased throughput and minimized optical aberrations.

Figure 2A:
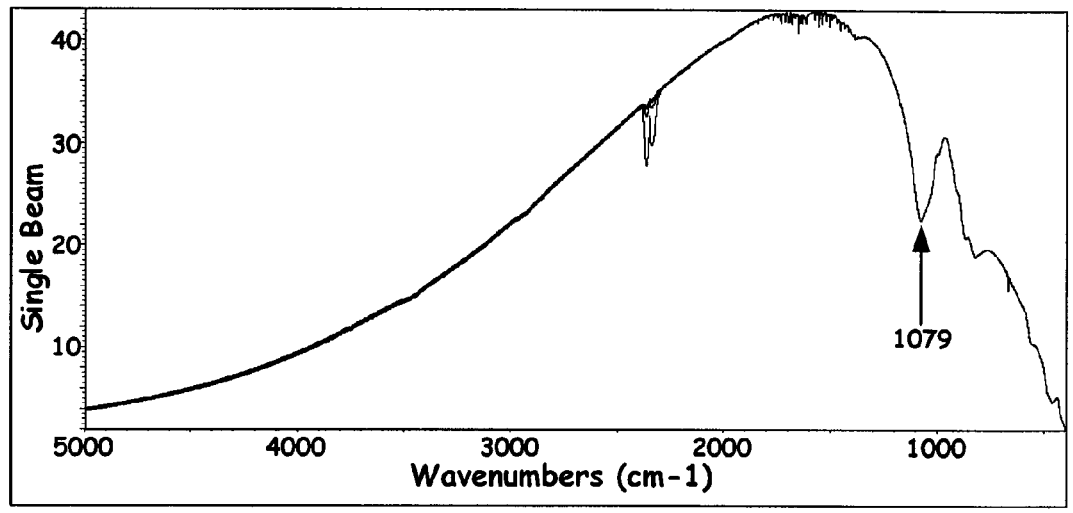
FIG. 2A shows spectral data with a resulting large artifact at 1079 wave numbers. The spectra itself was provided by 200 one minute backgrounds taken 15 minutes apart from a silicon nitride source with 2 weeks of burn-in and operated at 1100 degrees C.

The following non-limiting examples are illustrative of the invention. In particular, FIG. 2A shows spectral results of 200 one minute backgrounds taken 15 minutes apart for a silicon nitride source with 2 weeks of burn-in and operated at 1100 degrees C. While FIG. 2A shows a stable source output, it also shows a large artifact at 1079 wave numbers (shown labeled and with an accompanying arrow for convenience).

Figure 2B:
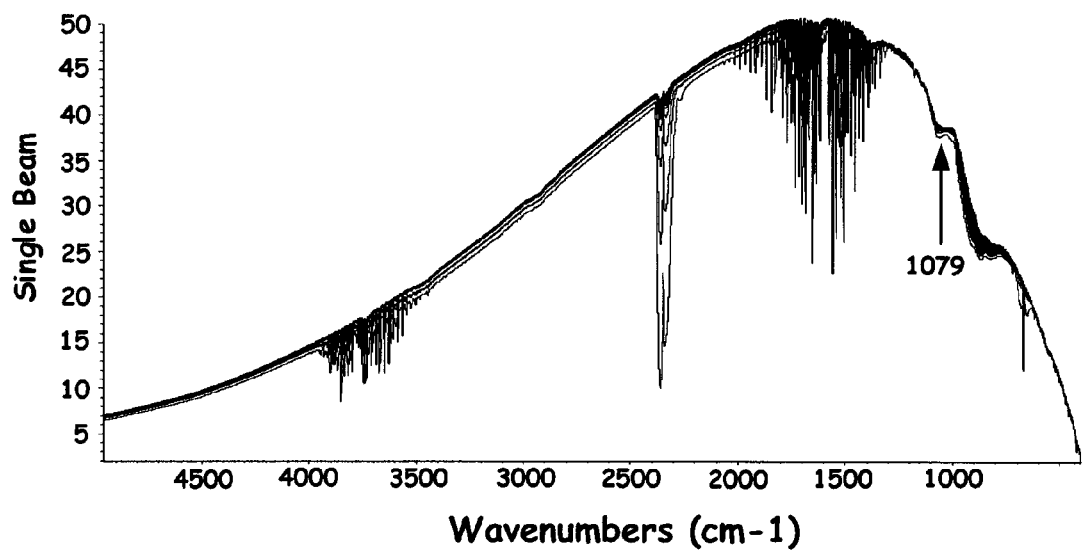
FIG. 2B shows the same silicon nitride source, as used to produce the data for FIG. 2A, but now integrated with RATH Incorporated 174/700 (86% Al2O3-14% SiO2) insulation.

FIG. 2B shows the same silicon nitride source, as used to produce the data for FIG. 2A, but now integrated with RATH Incorporated 174/700 (86% Al2O3-14% SiO2) insulation in a manner described above for embodiments of the present invention. Accordingly, because of the incorporated insulation, there was an increase in the temperature of up to about 1200 degrees C. and a resulting reduction in the artifact at 1079 wave numbers, as also shown labeled and with an accompanying arrow.

Figure 3A:
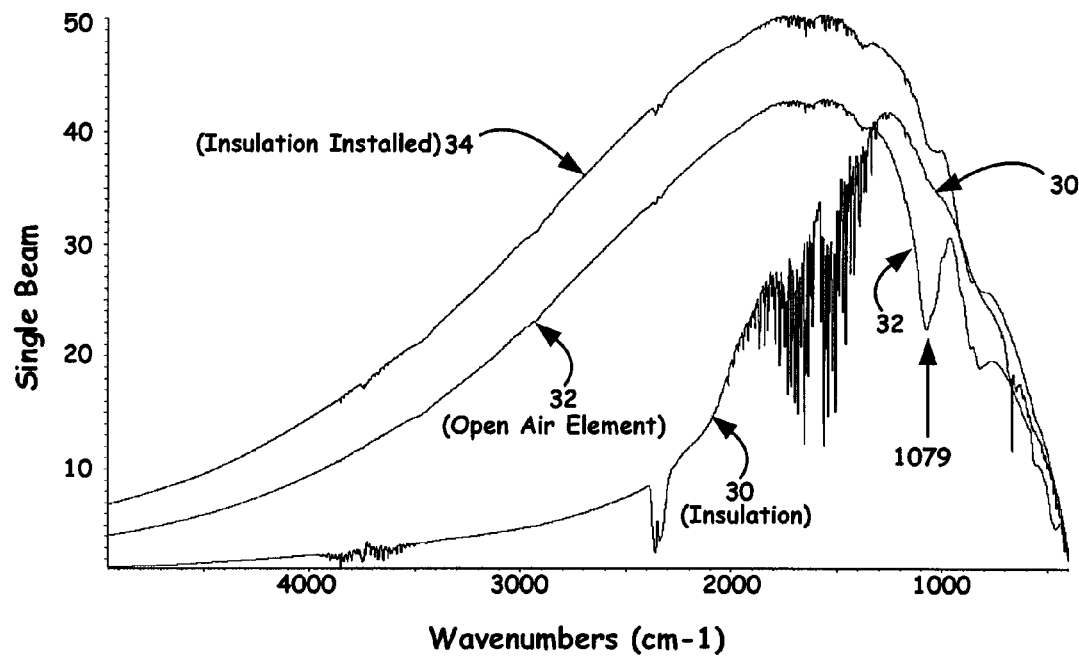
FIG. 3A shows three spectrum, the first spectrum resulting from the insulation heated with the source element in back of it, the second spectrum is with no insulation, and the third spectra is resulting from the insulation installed over the source.

FIG. 3A shows three spectra, the first spectra 30 is resulting from the insulation heated with the source element in back of it so that the insulation (i.e., Rath insulation) is the source of the system. The second spectra 32 is with no insulation, and the third spectra 34 is resulting from the insulation installed over the source.

Accordingly, the results, as shown in FIG. 3A, illustrates that the insulation alone does not have artifacts and that if the insulation is placed close to the element, it must be in contact with or proximate to (i.e., adjacent) to the infrared element so that it becomes hot enough to act as part of the source. Also to note, as shown in FIG. 3A, the insulation spectra (i.e., first spectra 30) below 1200 wave numbers beneficially provides for emissivity to fill in where the individual source element has low emissivity (e.g., see 1079 region for spectra 32).

Figure 3B:
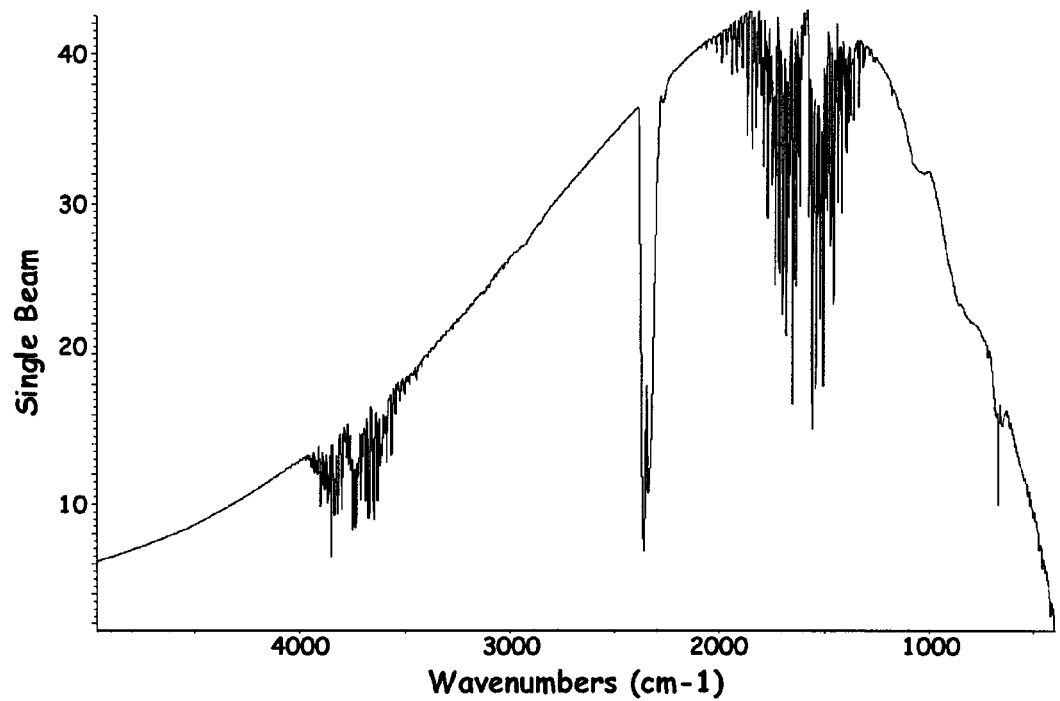
FIG. 3B shows spectral data from an insulation block that has a configured cone, as described in the present invention, having a predetermined outside diameter leading to an infrared element.

FIG. 3B shows data from an insulation block that has a cone leading to the element with an outside diameter of 0.210 and a inside diameter of 0.180. The hole for the infrared element is configured at about 3 mm and a 4.7 mm element was pressed in so that it made contact on all sides of the insulation. Thus, the results of FIG. 3A can be enhanced by designing a cone and cavity, as described above, that allows the light from the source to reflect off the insulation and recombine at the focus of the source mirror (e.g., the parabolic off-axis mirror) in a manner that assimilates an integrating sphere.

Figure 4A:
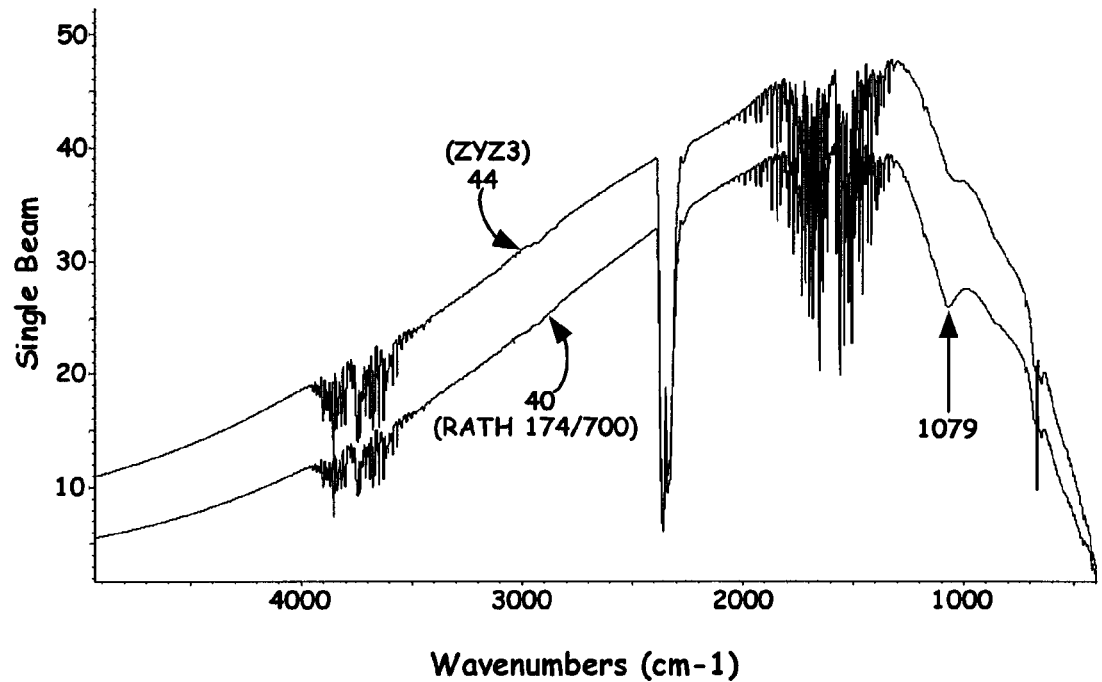
FIG. 4A shows a pair of spectral data resulting from RATH 174/700 and ZYZ3 insulation placed on a silicon carbide infrared element.

FIG. 4A shows a pair of spectral data resulting from RATH 174/700 insulation 40 and ZYZ3 insulation 44 placed on a silicon carbide infrared element. When the ZYZ3 insulation is utilized in the present invention, the temperature of the element goes from about 1120 degrees C. to greater than about 1300 degrees C. Note that the change of insulation, i.e., from RATH 174/700 insulation 40 to ZYZ3 insulation 44 reduces artifacts at about the 1079 wave number bandwidth (shown labeled in the RATH 174/700 insulation 40 spectra).

Figure 4B:
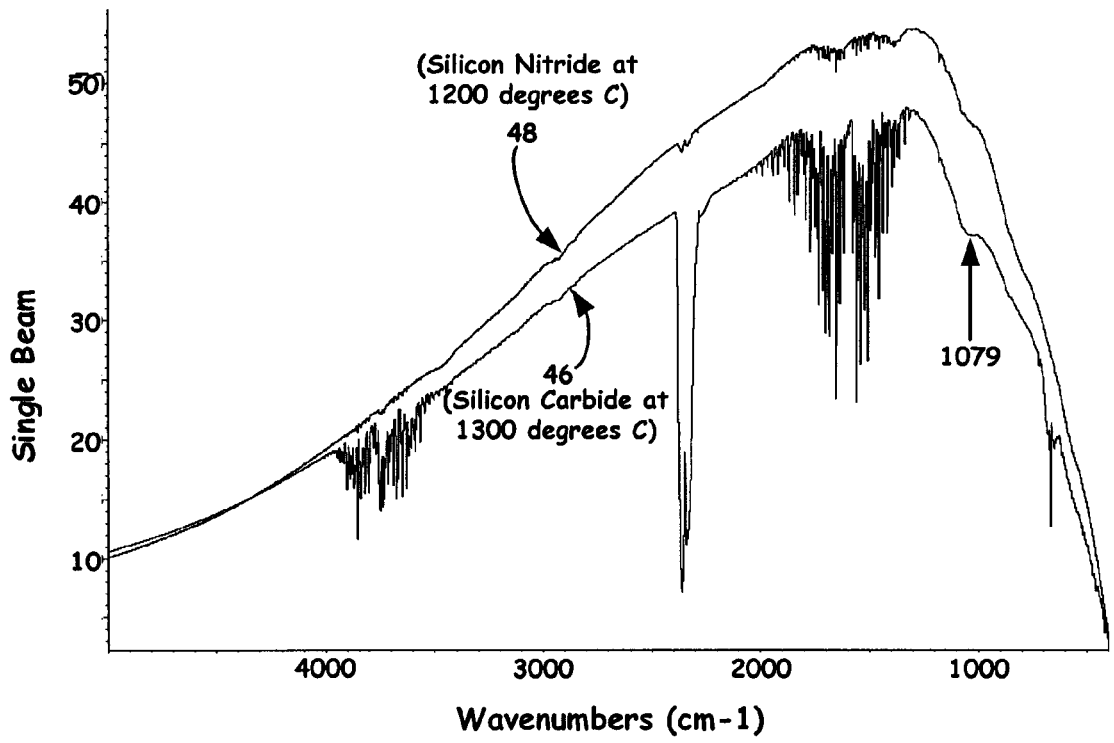
FIG. 4B shows a pair of spectral data from a silicon carbide infrared element at 1300 Degrees C. and a silicon nitride infrared element at 1200 Degrees C., wherein both have the ZYZ3 insulation installed and were run on the same system.

FIG. 4B shows a pair of spectral data from a silicon carbide infrared element 46 at 1300 Degrees C. and a silicon nitride infrared element 48 at 1200 Degrees C., wherein both have the ZYZ3 insulation installed and were both run on the same system. They are commonly scaled and show that even at a lower temperature the silicon nitride has more throughput due to the fact that there is a larger hot spot to image at the detector.

The discussion included in this application is intended to serve as a basic description. Although the present invention has been described in accordance with the various embodiments shown and described, one of ordinary skill in the art will readily recognize that there could be variations to the embodiments and those variations would be within the spirit and scope of the present invention. The reader should be aware that the specific discussion may not explicitly describe all embodiments possible; many alternatives are implicit. Such modifications and the like are considered simple modifications that are well within the ability of one of ordinary skill in the art and within the scope and spirit of the invention. Accordingly, many such modifications may be made by one of ordinary skill in the art without departing from the spirit, scope and essence of the invention. Neither the description, drawings nor the terminology is intended to limit the scope of the invention—the invention is defined by the claims.

What is claimed is:

1. An infrared source, comprising:
   a silicon nitride infrared element configured to be exposed to the ambient atmosphere, wherein said silicon nitride infrared element provides infrared radiation at desired wavelengths when heated to a predetermined temperature range; and
   an insulator coupled with said silicon nitride infrared element, the insulator configured so as to reach a collaborative temperature range provided by the generated heat from said silicon nitride infrared element, wherein said insulator at said collaborative temperature range provides for one or more desired infrared emission spectral bands that co-add with the output emission of said silicon nitride infrared element so as to eliminate spectral deficiencies resulting from said silicon nitride infrared element reaching said collaborative temperature range, wherein one or more walls of said insulator are configured as a conical interior that converges towards an opening formed by said walls that defines an optical aperture of said source so as to enhance co-added emission of said insulator and said silicon nitride infrared element optical spectral output and additionally match a field of view of a coupled spectrometer imaging element, wherein the surface of said walls which form said conical interior are exposed such that said desired infrared emission spectral bands are emitted from said surface and co-add with the output emission of said silicon nitride infrared element, and further wherein said conical interior is characterized by an outside diameter at one end and a smaller, inside diameter at an opposing end and wherein said walls which form said conical interior are further configured to provide an elongated channel which extends from said opposing end of said conical interior and terminates at said opening which defines said optical aperture, said elongated channel characterized by a length defined from said opposing end to said opening, and further wherein said silicon nitride infrared element is nested within said elongated channel and positioned at said opening such that within said elongated channel said insulator contacts all sides of said silicon nitride infrared element except for an exposed surface at said opening.

2. The infrared source of claim 1, wherein said co-added one or more desired infrared emission spectral bands provided by said heated insulator comprise optical radiation of less than about 1500 cm$^{-1}$.

3. The infrared source of claim 1, wherein said co-added one or more desired infrared emission spectral bands provided by said heated insulator comprise optical radiation of at about 1079 cm$^{-1}$.

4. The infrared source of claim 1, wherein said insulator heats up to a desired temperature range with said infrared element that increases the co-added emissivity by up to about 50%.

5. The infrared source of claim 1, wherein said insulator comprises a porous ceramic material configured to withstand the operating temperatures.

6. The infrared source of claim 1, wherein said insulator comprises at least one insulator selected from: an aluminum oxide or a zirconium insulator.

7. The infrared source of claim 1, wherein said predetermined temperature range comprises a range from about 700 degrees C. up to about 1400 degrees C.

8. The infrared source of claim 1, wherein collaborative temperature range comprises a range from about 700 degrees C. up to about 1400 degrees C.

9. The infrared source of claim 1, wherein said silicon nitride infrared element is heated by an electrical source or an optical source.

10. The infrared source of claim 9, wherein said optical source includes a laser diode.

11. The infrared source of claim 1, wherein said walls of said insulator are configured as conical interior surfaces converging to a circular opening which defines said optical aperture of said source.

12. The infrared source of claim 11, wherein said coupled spectrometer imaging element comprises f-numbers from about f/4 to about f/1 so as to have said field of view optimized with said optical aperture.

13. The infrared source of claim 1, wherein said outside diameter is about 0.210 inches or less, said inside diameter is about 0.180 inches or less and said length is about 0.020 inches or less.

14. The infrared source of claim 1, wherein said silicon nitride infrared element is a glow plug comprising a plug of silicon nitride configured as a sleeve about a tungsten element.

15. The infrared source of claim 14, wherein said glow plug is characterized by a diameter in the range of from about 0.125 inches to about 0.185 inches.

16. The infrared source of claim 1, wherein said silicon nitride infrared element, said conical interior and said elongated channel are exposed to the ambient atmosphere surrounding said infrared source when heated.

17. The infrared source of claim 16, wherein said predetermined temperature range is from about 1100 degrees C. up to about 1400 degrees C.

18. The infrared source of claim 1, wherein said infrared source does not comprise a window through which said co-added emission of said insulator and said silicon nitride infrared element is emitted.

19. The infrared source of claim 18, wherein said predetermined temperature range is from about 1100 degrees C. up to about 1400 degrees C.

* * * * *